United States Patent [19]
Sennowitz

[11] 3,808,392
[45] Apr. 30, 1974

[54] ASTABLE FREE-RUNNING MULTIVIBRATOR

[75] Inventor: Kurt H. Sennowitz, Royal Oak, Mich.

[73] Assignee: Electronic Removal of Metals, Inc., Clawson, Mich.

[22] Filed: Jan. 11, 1972

[21] Appl. No.: 216,974

[52] U.S. Cl. .............. 219/69 C, 219/69 P, 331/144
[51] Int. Cl. ........ B23k 9/16, H03f 1/30, H03g 3/20
[58] Field of Search ......... 219/69 C, 69 P; 331/143, 331/144, 145

[56] References Cited
UNITED STATES PATENTS
3,243,567   3/1966   Lobur .............................. 219/69 C
3,292,040  12/1966   Ullmann et al. ................ 219/69 P X

*Primary Examiner*—J. V. Truhe
*Assistant Examiner*—Hugh D. Jaeger
*Attorney, Agent, or Firm*—Weiner, Basile and Weintraub

[57] ABSTRACT

An astable free-running multivibrator for generating square wave pulses for an electrical discharge machining power supply. A pair of electronic control devices are biased for alternate operation, and a pair of resistance-capacitance networks are operatively connected to the control element of one of the electronic control devices. Means are operatively connected to the multivibrator for independently varying the interpulse period and the pulse width of the series of square wave pulses. The pulses from the multivibrator are amplified in the driver stages whose output switches the direct current supply in the output stage, which in turn supplies machining pulses to the erosion gap.

6 Claims, 1 Drawing Figure

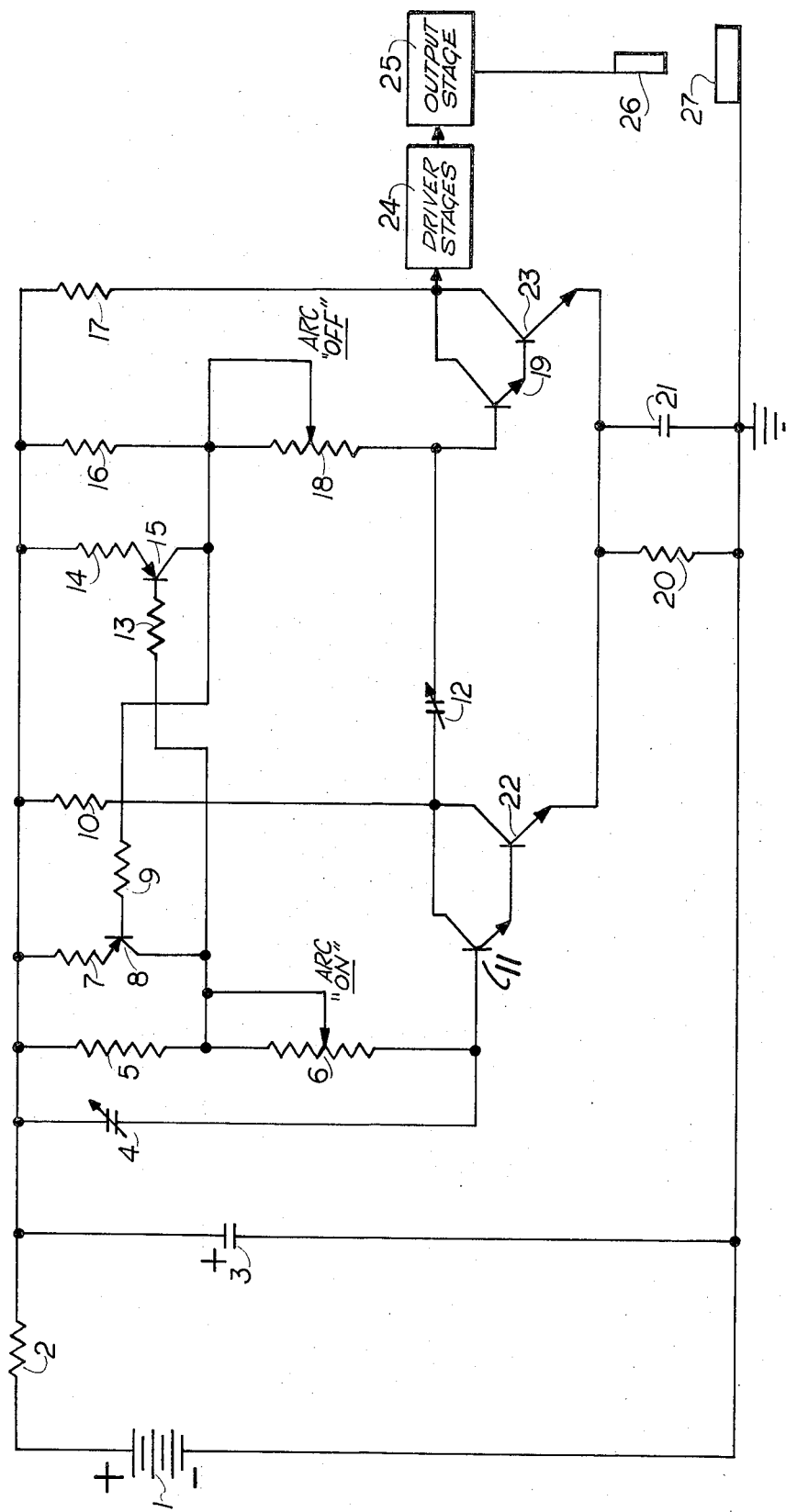

ASTABLE FREE-RUNNING MULTIVIBRATOR

The present invention relates to an astable free-running multivibrator, and in particular relates to an improved multivibrator which is especially suited for generating substantially rectangular shaped wave pulses for an electrical discharge machining power supply.

BACKGROUND OF THE INVENTION

In most conventional multivibrators, the charge and discharge rate of a single capacitor determines the duration of one quasistable state. Consequently, the mark-to-space ratio is limited. The present invention provides a multivibrator wherein the interpulse period and the pulse width can be varied independently.

The present invention is particularly suited to generate square wave pulses for an electrical discharge machining power supply. In electrical discharge machining, arc machining is carried out by passing a series of discrete, localized extremely high current densities discharge across a gap between a conductive tool electrode and a workpiece at sonic or ultrasonic frequencies in the presence of a dielectric fluid for eroding the workpiece. The defining characteristic of electrical discharge machining is that the coolant is a dielectric, such as kerosene, transformer oil, or pure water, and is broken down in minute localized areas by the action of the machining power supply between the closest points of the tool and the workpiece.

In this disclosure the terms "electronic control device" and "electronic switching device" are intended to mean any electronic control device, such as a vacuum tube, transistor, etc., having three or more electrodes consisting of at least two electrodes acting as a switch in the power circuit, and wherein the conductivity between the power electrodes is controlled by a control electrode whereby the conductivity of the power circuit is controlled electrically without movement of any mechanical elements within the device.

SUMMARY OF THE INVENTION

The present invention provides an astable free-running multivibrator for generating a series of substantially rectangular shaped wave pulses, including a pair of electronic control devices biased for alternate operation, and a pair of resistance-capacitance networks operatively connected to a control electrode of one of the electronic control devices, respectively. Means operatively connected to the multivibrator are provided for independently varying the interpulse period and the pulse width of the series of substantially rectangular shaped wave pulses generated by the multivibrator.

The present invention also provides a multivibrator comprising, in combination, a source of direct current having first and second terminals, and first, second, third and fourth electronic control devices each of which includes first, second and third electrodes. First capacitive means is connected between the first terminal of the source of direct current and the first electrode of the first electronic control device. Second capacitive means is connected between the second electrode of the first electronic control device and the first electrode of the second electronic control device. The third electrodes of the first and second electronic control devices are connected to the second terminal of the source of direct current. First resistive means is connected between the first terminal of the source of direct current and the first electrode of the first electronic control device. Second resistive means is connected between the first terminal of the source of direct current and the first electrode of the second electronic control device. Third resistive means connected between the first terminal of the source of direct current and the second electrode of the first electronic control device. Fourth resistive means is connected between the first terminal of the source of direct current and the second electrode of the second electronic control device. Fifth resistive means is connected between the first terminal of the source of direct current and the third electrode of the third electronic control device. Sixth resistive means is connected between the first terminal of the source of direct current and the third electrode of the fourth electronic control device. Seventh resistive means is connected between the second electrode of the third electronic control device and the first electrode of the fourth electronic control device. Eighth resistive means is connected between the first electrode of the third electronic control device and the second electrode of the fourth electronic control device. The second electrode of the third electronic control device is connected to a portion of the first resistive means. The second electrode of the fourth electronic control device is connected to a portion of the second resistive means. Utilization means are connected to the second electrode of the second electronic control device whereby predetermined output pulses from the multivibrator are delivered to the utilization means.

BRIEF DESCRIPTION OF THE DRAWING

The FIGURE of the drawing illustrates a schematic of an astable free-running multivibrator in accordance with the principles of the present invention.

DESCRIPTION

While the following description relates to an astable free-running multivibrator in connection with an electrical discharge machining apparatus, it should be noted that the multivibrator in accordance with the principles of the present invention may be used in a myriad of other environments and applications other than electrical discharge machining apparatus.

The astable free-running multivibrator depicted in FIG. 1 is especially suited to generate square wave pulses for an electrical discharge machining power supply. A source of direct current or a DC supply 1 is shown connected to a dropping resistor 2. A capacitor 3 connected between one terminal of the DC supply and the dropping resistor 2 constitutes a filter. The dropping resistor 2 and the filter capacitor 3 prevent transients from upsetting the multivibrator.

A pair of electronic control devices, or first and second electronic control devices, are biased for alternate operation. The first electronic control device may comprise two switching devices or transistors 11 and 22. The second electronic control device may comprise two switching devices or transistors 19 and 23. The output pulse of the multivibrator appearing on the collectors of transistors 19 and 23 is amplified in the driver stages 24 whose output switches the direct current supply in the output stage 25, which in turn supplies machining pulses to the erosion gap between the conductive tool electrode and the workpiece.

The emitter-coupled transistors 22 and 23 have a wide ON-to-OFF time or OFF-to-ON time ratio for periods ranging from ½ a microsecond to seconds. It is a distinct advantage and very important to change the arc OFF-time only if a lower arc current is desirable to maintain a steady overcut while the arc ON-time is constant for more stable cutting operation.

With the multivibrator in accordance with the principles of the present invention, the interpulse period and the pulse width of the series of pulses generated by the multivibrator can be varied independently. On the other hand, the charge and discharge rate of one capacitor determines the duration of one quasi-stable state. Consequently, the mark-to-space ratio is limited.

In the circuit of the FIGURE of the drawing, when the first capacitive means or capacitor 4 discharges, the NPN Darlington transistors 11 and 22 are cut off, and the NPN Darlington transistors 19 and 23 conduct.

During the time the second capacitive means or capacitor 12 discharges, the transistors 11 and 22 conduct and the transistors 19 and 23 are cut off. This means that capacitor 4 charges when transistors 11 and 22 conduct. When transistors 11 and 22 are saturated, their base current will be sufficient to charge capacitor 4 rapidly.

In order to make the circuit of the FIGURE of the drawing operate properly, the collector currents of transistors 19 and 23 must be greater than the collector currents of transistors 11 and 22 to increase the emitter voltage to a value greater than that of transistors 11 and 22. This increased emitter voltage will cut off transistors 11 and 22 whose open collector voltage is coupled through capacitor 12 to the base of transistor 19, thus driving transistor 19 into saturation.

The ON-time duration is the time required for capacitor 4 to discharge until it raises the base of transistor 11 to the emitter voltage. This base voltage drives transistor 11 into full conduction which couples a negative pulse through capacitor 12 to the base of transistor 19 thus turning it. OFF.

The OFF-time is determined by the time required for capacitor 12 to discharge until the base voltage of transistor 19 increases to the emitter voltage of transistor 22. This will cause transistors 19 and 23 to conduct and will cause transistors 11 and 22 to be cut off.

During transistor saturation, the emitter-to-base and emitter-to-collector voltage drops are negligible.

Connected across capacitor 4 are first resistive means comprising a resistor 5 and an arc ON rheostat 6. Connected between the base of transistor 19 and the common terminal of capacitor 4 and resistor 5 are second resistive means comprising a resistor 16 and an arc OFF rheostat 18.

Third resistive means comprising resistor 10 is connected between the collectors of transistors 11 and 22 and the common junction of capacitor 4 and resistor 5. Fourth resistive means comprising a resistor 17 is connected between the collectors of transistors 19 and 23 and the common junction between capacitor 4 and resistor 5.

An important feature of the present invention resides in the means for independently varying the interpulse period and the pulse width of the series of pulses generated by the multivibrator. Such means includes electronic switching means or transistors 8 and 15 and their respective drive limiting resistors 9 and 13, and predetermined impedance elements, such as resistors 7 and 14.

The R-C network comprising resistor 20 and capacitor 21 aid in the pulse generation, and aid in the fast starting, and at the same time help to bypass transients. Although not forming part of the multivibrator proper, a conductive tool electrode 26 is shown in the FIGURE of the drawing connected to the output stage 25, and a workpiece 27 is shown connected to the grounded terminal of capacitor 21.

Neglecting the reverse leakage current of the transistors, the ON-time (T1) can be calculated as follows:
$$T1 = R5 + R6 \times C4 \ln [R10 (R17 + R20)/R17 (R10 + R20)]$$

The OFF-time interval (T2) is given by:
$$T2 = R16 + R18 \times C12 \ln [(2R10R17 + R20 [R10 + R17])/R10 (R17 + R20)]$$

In the above calculations, the value of the capacitor 21 and the perimeters of the transistor 8 and 15 circuits have been neglected. pulse ON-time to pulse OFF-time which is desired for electrical discharge machining operation to lower the cutting current to a very low value with one knob. For example, the one knob may be used to control the arc OFF-time potentiometer 18.

The resistor 20 and especially the capacitor 21 prevent the multivibrator from stalling, and also help restarting while switching frequencies, etc.

An important aspect of the present invention resides in the ability of the multivibrator to operate over a wide frequency range with only few components or parts because of the PNP transistors 8 and 15 which are switched automatically across resistors 5 and 16, respectively, with lower value resistors 7 and 14, respectively, to change the time constant of the resistance-capacitance networks for a wider or narrower ON-time at a wide frequency range. For electrical discharge machining operation, only one or two capacitors are needed for capacitive means 4 and 12.

The rheostat 6 in conjunction with its series resistor 5 and capacitor 4 changes the frequency. The potentiometer 6 is shorted out at high frequency. In order to have a wide ON-time pulse, PNP transistor 15 is turned ON through drive resistor 13 while the rheostat 6 is shorted out from 80 percent to 100 percent. A negative signal turns ON transistor 15 which conducts and thereby lowers the combined resistance with resistor 16 for a narrower OFF-time if rheostat 18 is shorted.

A similar pulse generation occurs when PNP transistor 8 is turned ON by a negative signal coming from an 80 percent to 100 percent shorting of the rheostat 18 for a higher frequency and a desired ON-time. The transistor 8 while conducting lowers the resistance across the capacitor 4 to change the frequency and the ON-time.

The drive limiting resistors 9 and 13 are chosen to turn ON transistors 8 and 15 at the appropriate times to change the frequency and ON-time automatically.

The arc OFF-time rheostat 18 changes the amperage in the gap between electrode 26 and workpiece 27 over a wide range keeping the pulse ON-time constant.

While the astable free-running multivibrator of the present invention has been illustrated in conjunction with electrical discharge machining apparatus, the invention will be seen not to be limited to this environment, but rather equally applicable to any appropraite electrically operated apparatus.

I claim:
1. A multivibrator for use in electrical discharge machining, comprising, in combination:
  a source of direct current having first and second terminals;
  first, second, third and fourth electronic control devices each of which includes first, second and third electrodes;
  first capacitive means connected between said first terminal of said source of direct current and said first electrode of said first electronic control device;

The variable capacitors 4 and 12 and the arc ON rheostat and the arc OFF rheostat 18 are used to change the T1 and T2 On and OFF times of the multivibrator. In a preferred embodiment of the present invention, the rise and fall times of the output voltage pulse appearing on the collectors of transistors 19 and 23 are about 0.1 to 0.2 microseconds, respectively.

The capacitor C12 and the OFF-time rheostat 18 can be varied over a wide range against capacitor 4 and the ON-time rheostat 6 to have a mark-to-space ratio of 1:500 or 1:1000 second capacitive means connected between said second electrode of said first electronic control device and said first electrode of said second electronic control device;
  said third electrodes of said first and second electronic control devices being connected to said second terminal of said source of direct current;
  first resistive means connected between said first terminal of said source of direct current and said first electrode of said first electronic control device;
  second resistive means connected between said first terminal of said source of direct current and said first electrode of said second electronic control device;
  third resistive means connected between said first terminal of said source of direct current and said second electrode of said first electronic control device;
  fourth resistive means connected between said first terminal of said source of direct current and said second electrode of said second electronic control device;
  fifth resistive means connected between said first terminal of said source of direct current and said third electrode of said third electronic control device;
  sixth resistive means connected between said first terminal of said source of direct current and said third electrode of said fourth electronic control device;
  seventh resistive means connected between said second electrode of said third electronic control device and said first electrode of said fourth electronic control device;
  eighth resistive means connected between said first electrode of said third electronic control device and said second electrode of said fourth electronic control device;
  said second electrode of said third electronic control device being connected to a portion of said second resistive means; and
  utilization means connected to said second electrode of said second electronic control device whereby predetermined output pulses from said multivibrator are delivered to said utilization means.

2. A multivibrator according to claim 1 for use in electrical discharge machining, wherein:
  said utilization means includes a driver stage whose output is connected to an output stage whose output is in turn connected to an electrical discharge machining apparatus;
  said output stage including a direct current supply which furnishes electrical machining pulses to the erosion gap of said electrical discharge machining apparatus;
  whereby said predetermined output pulse of said multivibrator is amplified in said driver stage whose output switches said direct current supply in said output stage which furnishes electrical machining pulses to said erosion gap of said electrical discharge machining apparatus.

3. A multivibrator according to claim 1, wherein said first electronic control device includes a first electronic switching device and a second electronic switching device each of which electronic switching devices includes first, second and third electrodes;
  said first capacitive means being connected between said first terminal of said source of direct current and said first electrode of said first electronic switching device;
  said second electrodes of said first and second electronic switching devices being connected together;

said third electrode of said first electronic switching device being connected to said first electrode of said second electronic switching device;
  said second electronic control device including third and fourth electronic switching devices each of which electronic switching devices includes first, second and third electrodes;
  said second capacitive means being connected between said first electrode of said third electronic switching device and said second electrodes of said first and second electronic switching devices;
  said third resistive means being connected between said first terminal of said source of direct current and said first electrode of said third electronic switching device;
  said third resistive means being connected between said first terminal of said source of direct current and said second electrodes of said first and second electronic switching devices;
  said second electrodes of said third and fourth electronic switching devices being connected together;

said fourth resistive means being connected between said first terminal of said source of direct current and said second electrodes of said third and fourth electronic switching devices;
  said utilization means being connected to said second electrodes of said third and fourth electronic switching devices whereby predetermined output pulses are delivered to said utilization means;
  said third electrode of said third electronic switching device being connected to said first electrode of said fourth electronic switching device;
  and said third electrodes of said second and fourth electronic switching devices being connected to said second terminal of said source of direct current.

4. A multivibrator according to claim 1, including:
ninth resistive means connected between said first terminal of said source of direct current and said first capacitive means;
third capacitive means connected between said second terminal of said source of direct current and the common junction between said ninth resistive means and said first capacitive means;
tenth resistive means connected between said second terminal of said source of direct current and said third electrodes of said first and second electronic control devices;
and fourth capacitive means being connected between said second terminal of said source of direct current and said third electrodes of said first and second electronic control devices.

5. A multivibrator according to claim 1, wherein:
said first capacitive means includes a variable capacitive element;
said second capacitive means includes a variable capacitive element;
said first resistive means includes a rheostat; and
said second resistive means includes a rheostat.

6. An astable free-running multivibrator for generating a series of substantially rectangular wave pulses for an electrical discharge machining apparatus, comprising in combination:
a pair of electronic control devices biased for alternate operation;
a pair of resistance-capacitance networks each operatively connected to a control electrode of one of said electronic control devices, respectively; and
means operatively connected to said astable free-running multivibrator for independently varying the interpulse period and the pulse width of said series of substantially rectangular wave pulses generated by said astable free-running multivibrator, wherein:
said means for independently varying the interpulse period and the pulse width of said series of substantially rectangular wave pulses generated by said astable free-running multivibrator includes a first electronic switching device and a second electronic switching device;
said first and second electronic switching devices being electrically and operably connected to said pair of electronic control devices biased for alternate operation; and
said first and second electronic switching devices are automatically switched across at least a portion of the resistance of said resistance-capacitance networks to change the time constants of said resistance-capacitance networks for a wider or narrower ON-time.

* * * * *